May 11, 1954  V. F. LINDER  2,678,080
BRAKE
Filed Jan. 29, 1951
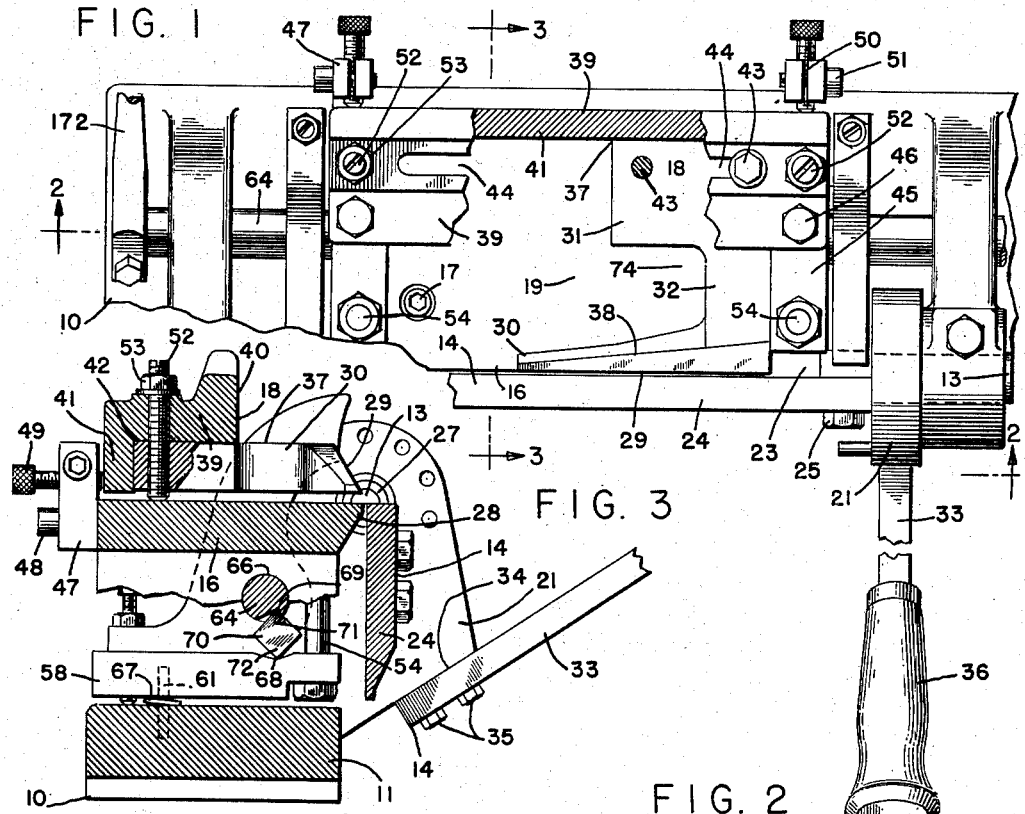
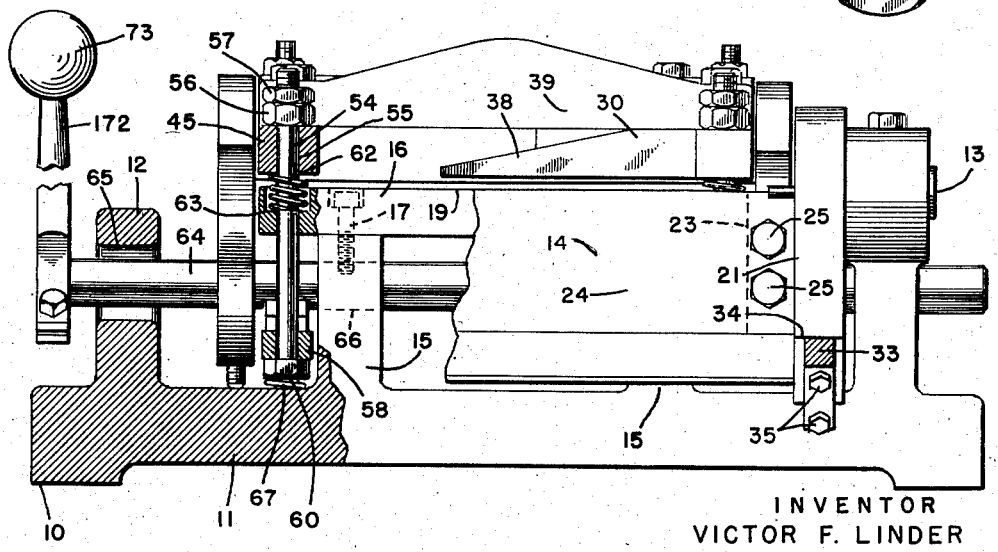
INVENTOR
VICTOR F. LINDER
BY Caswell & Lagaard
ATTORNEYS Patented May 11, 1954

2,678,080

UNITED STATES PATENT OFFICE 2,678,080

BRAKE

Victor F. Linder, Lake City, Minn., assignor to O'Neil-Irwin Manufacturing Company, Lake City, Minn., a corporation of Minnesota Application January 29, 1951, Serial No. 208,307

2 Claims. (Cl. 153—16)

The herein disclosed invention relates to metal bending brakes and particularly to a brake on which tubular parts may be readily formed.

An object of the invention resides in providing a brake having a clamping device including a jaw structure and to which a clamping member having a finger disposed parallel to the line of contact of the clamping jaws may be attached.

Another object of the invention resides in providing the jaw structure with a supporting bar and to which said finger is attached and in constructing said finger with an arm attached to the bar and projecting outwardly therefrom.

Another object of the invention resides in constructing said finger U-shaped in form.

Other objects of the invention reside in the novel combination and arrangement of parts and in the details of construction hereinafter illustrated and/or described.

In the drawings:

Fig. 1 is a plan view of a brake with parts broken away and illustrating an embodiment of the invention applied thereto.

Fig. 2 is an elevational sectional view of the brake taken on line 2—2 of Fig. 1.

Fig. 3 is a cross sectional view taken on line 3—3 of Fig. 1.

For the purpose of illustrating the invention a brake has been shown in the drawings which is designated by the reference numeral 10. This brake comprises a base 11 formed with standards 12 at the ends of the same. These standards have attached to them stub shafts 13 which are disposed in alignment and which pivotally support for swinging movement relative to the base 11 a bender 14. The base 11 has two supporting blocks 15 formed thereon and which carry a bed 16. The bed 16 is attached to the blocks by means of screws 17 which extend through said bed and which are countersunk in the upper surface 19 of said bed and which are screwed into the blocks 15. Mounted on the bed 16 is a clamping device 18 which holds in position on the bed 16 the work to be bent.

The bender 14 comprises two arms 21 which are identical in construction and which are formed with bearings 27 through which the stub shaft 13 extend. These arms have offset portions 23 projecting outwardly therefrom. To these offset portions of each of the arms is attached a forming bar 24. Cap screws 25 extend through said bar and are screwed into the offset portions 23 to securely attach the bar to the same. By means of this construction the two arms 21 of the bender are rigidly tied together and operate in unison.

For swinging the bender a bar 33 is employed which overlies a surface 34 formed on one of the arms 21 and is secured thereto by means of cap screws 35 which extend through said bar and are screwed into the said arm. The bar 33 has secured to the outer end thereof a handle 36 by means of which said bender may be swung about the axis of the stub shafts 13.

The clamping device 18 comprises a jaw structure 37 which consists of a clamp member 30 forming the principal feature of the instant invention. This clamp member is carried by a supporting bar 39. The bed 16 forms the other clamp member of the clamping device and which cooperates with the clamp member 30. The bar 39 is angular in form having a horizontal flange 40 and a vertical flange 41. The clamp member 38 fits into the bight 42 formed between these flanges.

The clamp member 30 is constructed U-shaped in form having a base 31 with an arm 32 extending outwardly therefrom. Projecting laterally from said arm is a finger 38 which lies parallel with the forward edge 28 of the bed 16. The base 31 fits into the bight 42 and is secured to the supporting bar 39 by means of cap screws 43 which extend through slots 44 formed in the flange 40 of bar 39 and are screwed into the base 43. The bight 42 and the base 43 are ground square so that the clamp member 30 is held from turning and so that the outer edge 29 of said clamp bar is parallel with the edge 28 of the bed 16.

At the ends of the bar 39 are provided arms 45 which project outwardly therefrom. These arms are disposed in the bight 42 of bar 39, the same as the clamp member, and are attached thereto by means of cap screws 46. These cap screws are located at the forward portion of the bar 39.

For resisting rearward movement of bar 39 posts 47 are employed which are secured to the end of the bed 16 by means of cap screws 48. These screws extend through the said posts and are screwed into the bed. Dowel pins, not illustrated in the drawings, also extend through said posts and into the bed and prevent the posts from turning. These posts are threaded to receive adjusting screws 49 which project forwardly through said posts and are adapted to engage the flange 41 of the supporting bar 39. The posts 47 are formed with slits 50 shown in Fig. 1 and which extend down to the screws 49. Cap screws 51 extend through the upper portions of said posts and clamp the same together to hold the screws 49 from rotation. By means of this construction the forward edges 29 of finger 38 may be adjusted to any position with reference to the forward edge 28 of the bed 16. The elevation of the rearward portion of the clamp member 18 is determined by means of two adjusting screws 52. These screws pass through the flange 40 of supporting bar 39 and are screwed into the arms 45. These screws pass completely through said arms and engage the upper surface of the bed 16. Lock nuts 53 mounted on these screws and engaging the upper surface of the flange 40 hold the screws in adjusted position and also assist in clamping the arms 45 to the bar 39.

For operating the jaw structure 37 two bolts 54 are employed. These bolts extend through holes 55 in the arms 45 and have attached to the ends of the same nuts 56 and lock nuts 57. The said bolts further extend through two clamp levers 58 which are disposed above the base 11. The heads 60 of these bolts engage the underside of the said clamp levers. Clamp levers 58 are held in position on the base 60 by means of dowel pins 61 which extend loosely through said levers and are driven into the base 11. Washers 67 encircle the said dowel pins and form a support for the rearward portions of the said levers. By means of this construction the clamping levers 58 are supported for a slight amount of swinging movement.

The jaw structure 37 is urged upwardly by means of compression coil springs 62 which encircle the bolts 54 and which are received in cavities 63 formed in the bed 16. The said springs engage the bed 16 from above and the arms 45 from below and urge the jaw structure 37 upwardly so that the sheet metal to be bent and which is disposed between the finger 38 and bed 16 can be readily inserted therebetween.

The clamping device 18 further includes a rock shaft 64. The rock shaft extends through two blocks 15 and is journalled in bearings 66 formed therein. Said rock shaft also extends through holes 65 formed in the standards 12 and projects outwardly beyond the ends of the same. The rock shaft 64 is located intermediate the clamping levers 58 and the bed 16.

For operating the levers 58 said levers are each provided with a V-shaped notch 68. In a similar manner the shaft 64 is formed with two V-shaped notches 69 which are eccentric with reference to the axis of the said shaft and which are disposed above the notches 68. Between the shaft 64 and the levers 58 are disposed two thrust members 70 which have fulcrums 71 and 72 seated in the notches 68 and 69. When the shaft 64 is in the position shown in Fig. 3 the crotch of the notch 69 is to the right of the lines joining the axis of the shaft 64 and the crotch of the notch 68. Movement of the shaft 64 in a clockwise direction as viewed in this figure causes the crotch of the notch 69 to move to a position substantially in said line or to a slight amount to the left of said line. This urges the lever 58 downwardly and the bolts 54 which form links between said levers in the arms 45 draw the jaw structure 37 downwardly to clamp the work between the finger 38 and the bed 16. For rocking the shaft 64 a handle 172 is employed which is attachable to either end of said shaft and which has secured to the end of same a knob 73 by means of which said handle may be manipulated.

The use of the invention is as follows:

In the event that a rectangular tube is to be formed the blank from which the same is to be made is clamped under the projecting portion of the finger 38 and the bed 36. Bending is then accomplished in the usual manner by raising the bar 33 and swinging the forming bar 24 upwardly. The work is then turned bringing the bent portion of the tube into the throat 74 formed between the base 31 and the finger 38 of the clamp member 30. The bending is then repeated until the complete tube is formed. The tube in its completed form may then be slid off endwise from the finger without distorting the metal of the tube.

The advantages of the invention are manifest. The device is extremely simple in construction and can easily be installed on the brake. The finger on which the parts are bent, being open at one end permits of readily sliding the work off from the finger when completed. The limits of size of the work bent is determined by the size of the throat formed between the finger and base.

Changes in the specific form of the invention, as herein described, may be made within the scope of what is claimed without departing from the spirit of the invention.

Having described the invention, what is claimed as new and desired to be protected by Letters Patent is:

1. In a metal brake a bed forming a clamp member and having an edge, a clamping device including a supporting bar parallel with said edge and disposed rearwardly thereof, said bar having a downwardly and forwardly facing rabbet therein, a jaw member U-shaped in form having an elongated base received in said rabbet, screws extending through said bar and screwed into said base, said jaw member further having an arm extending forwardly from said base at one end thereof and a finger extending outwardly from said arm at the forward end thereof and in the same direction as said base and spaced from said base to form a throat therebetween, said finger having an edge extending parallel with the edge of said clamp member and lying in close proximity thereto and above said edge when the work is clamped in position, and bending means pivoted to said bed and movable about said edge for bending the work clamped between said bed and finger over said edge of said finger, said base providing a reaction against said bar opposite said finger.

2. In a metal brake a bed forming a clamp member and having an edge, a clamping device including a supporting bar parallel with said edge and disposed rearwardly thereof, a jaw member carried by said bar and extending forwardly thereof, said jaw member being constructed with an elongated opening extending inwardly into the same from one side thereof and in the direction of said edge and forming a finger extending parallel to said edge and a base attached to said bar and spaced from said finger, said finger having an edge extending parallel with the edge of said clamp member and lying in close proximity thereto and above said edge when the work is clamped in position, bearings at the end of said clamp member and bending means journaled in said bearings and movable about said edge for bending the work clamped between said bed and finger over said edge of said finger, the end of said finger outwardly of said arm terminating short of said bearing to which it is directed to provide a work extraction space therebetween.

References Cited in the file of this patent

UNITED STATES PATENTS

| Number | Name | Date |
|---|---|---|
| 466,733 | Bradburn | Jan. 5, 1882 |
| 505,567 | Douglass | Sept. 26, 1893 |
| 2,160,441 | Peters | May 30, 1939 |
| 2,438,319 | Kilham | Mar. 23, 1948 |
| 2,474,683 | Linder | June 28, 1949 |